(12) United States Patent
Chauhan et al.

(10) Patent No.: US 11,233,864 B2
(45) Date of Patent: Jan. 25, 2022

(54) USER IDENTIFICATION FOR DIGITAL EXPERIENCE CONTROLS

(71) Applicant: T-Mobile USA, Inc., Bellevue, WA (US)

(72) Inventors: Kanakrai Chauhan, Snoqualmie, WA (US); Pandurang Kshirsagar, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/036,862

(22) Filed: Jul. 16, 2018

(65) Prior Publication Data

US 2019/0238644 A1    Aug. 1, 2019

Related U.S. Application Data

(60) Provisional application No. 62/624,650, filed on Jan. 31, 2018.

(51) Int. Cl.
G06F 15/16 (2006.01)
H04L 29/08 (2006.01)

(52) U.S. Cl.
CPC ............ *H04L 67/22* (2013.01); *H04L 67/306* (2013.01)

(58) Field of Classification Search
CPC ......... H04L 67/22; H04L 67/306; H04W 4/12
USPC ......................................................... 709/224
See application file for complete search history.

(56) References Cited

U.S. PATENT DOCUMENTS

| | | | |
|---|---|---|---|
| 8,332,500 B1* | 12/2012 | Singleton | G06Q 10/10 709/223 |
| 8,850,421 B2* | 9/2014 | Proud | H02J 50/70 717/172 |
| 9,167,404 B1* | 10/2015 | Freed | H04M 15/8055 |
| 9,264,426 B2 | 2/2016 | Buer et al. | |
| 9,425,627 B2* | 8/2016 | Proud | G16H 40/40 |
| 9,510,357 B1* | 11/2016 | Egner | H04W 4/60 |
| 9,723,367 B1 | 8/2017 | Long et al. | |
| 9,940,807 B1 | 4/2018 | Brasch et al. | |
| 10,063,564 B2 | 8/2018 | Seigel et al. | |

(Continued)

OTHER PUBLICATIONS

U.S. Appl. No. 16/036,867, Non Final Office Action dated May 21, 2020, 27 pages.

(Continued)

*Primary Examiner* — Moustafa M Meky
*Assistant Examiner* — Thorne E Waugh
(74) *Attorney, Agent, or Firm* — Han Santos, PLLC

(57) ABSTRACT

An example method of user identity tracking is performed by an application server. The Application server receives first telemetry data and second telemetry data. The first telemetry data indicates at least a first usage of a first user device. The second telemetry data indicates at least a second usage of a second user device. The Application server stores the first telemetry data and the second telemetry data to one or more databases and analyzes the telemetry data. Analyzing the telemetry data includes determining one or more usage patterns clustered by identity of a user. The Application server receives a request to query the one or more usage patterns for an identity of one or more users associated with the one or more usage patterns, where the application server provides the identity of the user in response to the request.

20 Claims, 6 Drawing Sheets

(56) References Cited

U.S. PATENT DOCUMENTS

| | | | |
|---|---|---|---|
| 10,291,465 B2 | 5/2019 | Rjeili et al. | |
| 10,346,905 B1 | 7/2019 | Chang et al. | |
| 2006/0223495 A1* | 10/2006 | Cassett | H04L 43/0876 455/405 |
| 2006/0277564 A1 | 12/2006 | Jarman | |
| 2008/0065746 A1 | 3/2008 | Moghaddam et al. | |
| 2009/0253431 A1* | 10/2009 | Shi | H04L 61/3085 455/435.1 |
| 2010/0268645 A1 | 10/2010 | Martino et al. | |
| 2012/0117221 A1* | 5/2012 | Katpelly | H04N 21/4135 709/224 |
| 2012/0238287 A1* | 9/2012 | Scherzer | H04W 72/0406 455/456.1 |
| 2012/0278867 A1 | 11/2012 | Cox et al. | |
| 2012/0310804 A1* | 12/2012 | Raleigh | H04L 69/24 705/34 |
| 2013/0010962 A1 | 1/2013 | Buer et al. | |
| 2013/0040629 A1 | 2/2013 | Sprigg et al. | |
| 2013/0223308 A1* | 8/2013 | Chandra | H04W 52/028 370/311 |
| 2013/0262233 A1* | 10/2013 | Bradley | H04W 4/12 705/14.64 |
| 2013/0303110 A1* | 11/2013 | Gauthier | H04W 12/80 455/405 |
| 2013/0340034 A1 | 12/2013 | Rich et al. | |
| 2014/0006483 A1 | 1/2014 | Garmark et al. | |
| 2014/0006947 A1 | 1/2014 | Garmark et al. | |
| 2014/0007154 A1 | 1/2014 | Seibold et al. | |
| 2014/0047512 A1 | 2/2014 | Sidi | |
| 2014/0189808 A1 | 7/2014 | Mahaffey et al. | |
| 2014/0215081 A1* | 7/2014 | Cili | H04L 47/24 709/227 |
| 2014/0289824 A1 | 9/2014 | Chan et al. | |
| 2014/0344927 A1 | 11/2014 | Turgeman et al. | |
| 2015/0082396 A1 | 3/2015 | Theebaprakasam et al. | |
| 2015/0089599 A1 | 3/2015 | Vignisson et al. | |
| 2015/0092673 A1* | 4/2015 | Singh | H04W 4/029 370/329 |
| 2015/0131488 A1 | 5/2015 | Martinez et al. | |
| 2015/0199660 A1 | 7/2015 | Dolan et al. | |
| 2015/0326550 A1 | 11/2015 | Schropfer et al. | |
| 2016/0103996 A1* | 4/2016 | Salajegheh | H04L 63/145 726/25 |
| 2016/0248766 A1 | 8/2016 | Tembey et al. | |
| 2016/0267524 A1* | 9/2016 | Ng | G06Q 30/0255 |
| 2016/0294920 A1 | 10/2016 | Besprosvan | |
| 2016/0301779 A1 | 10/2016 | Cui et al. | |
| 2016/0342992 A1 | 11/2016 | Lee | |
| 2016/0373548 A1 | 12/2016 | Fails | |
| 2017/0180394 A1 | 6/2017 | Crofton et al. | |
| 2017/0264628 A1 | 9/2017 | Treat et al. | |
| 2017/0353463 A1 | 12/2017 | Wu et al. | |
| 2018/0063670 A1* | 3/2018 | Garg | H04W 4/60 |
| 2018/0098216 A1* | 4/2018 | Vincent | H04W 4/70 |
| 2018/0288060 A1 | 10/2018 | Jackson et al. | |
| 2018/0352301 A1* | 12/2018 | Tofighbakhsh | H04N 21/252 |
| 2018/0373887 A1 | 12/2018 | Smith | |
| 2019/0124056 A1 | 4/2019 | Monibi et al. | |
| 2019/0180635 A1* | 6/2019 | Jennings | G06N 20/00 |
| 2020/0020220 A1 | 1/2020 | Stefanski et al. | |

OTHER PUBLICATIONS

U.S. Appl. No. 16/036,839 Non-Final Office Action dated Aug. 22, 2019, 13 pages.
U.S. Appl. No. 16/036,839, Notice of Allowance dated Oct. 29, 2019, 17 pages.
U.S. Appl. No. 16/036,855, Non-Final Office Action dated Aug. 20, 2020, 37 pages.
U.S. Appl. No. 16/036,867, Final Office Action dated Oct. 19, 2020, 28 pages.
U.S. Appl. No. 16/036,867, Office Action dated Jan. 26, 2021, 23 pages.
U.S. Appl. No. 16/036,875, Office Action dated Mar. 12, 2021, 58 pages.
U.S. Appl. No. 16/036,855, Final Office Action dated May 3, 2021, 42 pages.
Globenewswire, "WebSafety, Inc., iOS and Android App Now Available for Free to Help More Parents Protect Their Children Online", Jun. 16, 2015, GlobeNewsWire (Year: 2015).
U.S. Appl. No. 16/036,867, Final Office Action dated Jun. 25, 2021, 31 pages.
U.S. Appl. No. 16/036,875, Final Office Action dated Jul. 21, 2021, 41 pages.

* cited by examiner

USER IDENTIFICATION FOR DIGITAL EXPERIENCE CONTROLS

CROSS-REFERENCE TO RELATED APPLICATION

This application claims the benefit of U.S. Provisional Application No. 62/624,650, entitled "USER IDENTIFICATION FOR MOBILE EXPERIENCE CONTROLS," filed Jan. 31, 2018 and expressly incorporated herein by reference in its entirety.

BACKGROUND

Wireless communication networks are widely deployed to provide various types of communication content such as, voice, text, data, and so on. Typical wireless communication networks may be multiple-access systems capable of supporting communication with multiple users by sharing available system resources (e.g., bandwidth, transmission power, etc.). Earlier examples of such multiple-access systems may include code division multiple access (CDMA) systems, time division multiple access (TDMA) systems, frequency division multiple access (FDMA) systems, and more recent examples include orthogonal frequency division multiple access (OFDMA) systems, and the like. Additionally, the systems can conform to specifications such as third generation partnership project (3GPP), 3GPP long-term evolution (LTE), ultra-mobile broadband (UMB), evolution data optimized (EV-DO), etc.

Generally, wireless multiple-access communication systems may simultaneously support communication for multiple wireless devices. Each wireless device may communicate with one or more base stations via transmissions on forward and reverse links. The forward link (or downlink) refers to the communication link from base stations to wireless devices, and the reverse link (or uplink) refers to the communication link from wireless devices to base stations.

The wireless communication network is controlled and operated by a mobile network operator (MNO). In some scenarios, access to the wireless communication network is granted to all users associated with an active account with the MNO. For example, users comprising the family or group for an account may be granted access to the wireless communication network.

In some scenarios, the MNO may track activities associated with an account, such as which services were utilized, the types of content consumed, and/or how their wireless devices were used. However, the boundaries between user devices and users are blurring. For example, different members of a family plan may use the same device and certain members of the family plan may use different devices. In another example, the same device may be used to make purchases by different users covered under the same plan. In yet another example, a user may use different device types when accessing various services. Accordingly, it is difficult to determine with a high degree of confidence that the behavior on a certain device and/or with a certain account can be accurately mapped to a specific user.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Aspects of the present disclosure are directed to computing platforms (i.e., user equipment, server, etc.), computer-readable media, and processes for user identification for digital experience controls.

As mentioned above, some MNOs may enable the tracking of user activity by account. However, with multiple users using the same devices as well as the same user using multiple devices, it is often difficult to determine whether a certain activity can be accurately mapped to a specific user. Accordingly, aspects of the present disclosure include a user identity tracking module that provides a high degree of confidence that the correct user is being tracked. As will be described in more detail below, aspects of the present disclosure may include device usage, user behavior, as well as other factors to corroborate the identity of a specific user.

A user device, also referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

Figure 1:
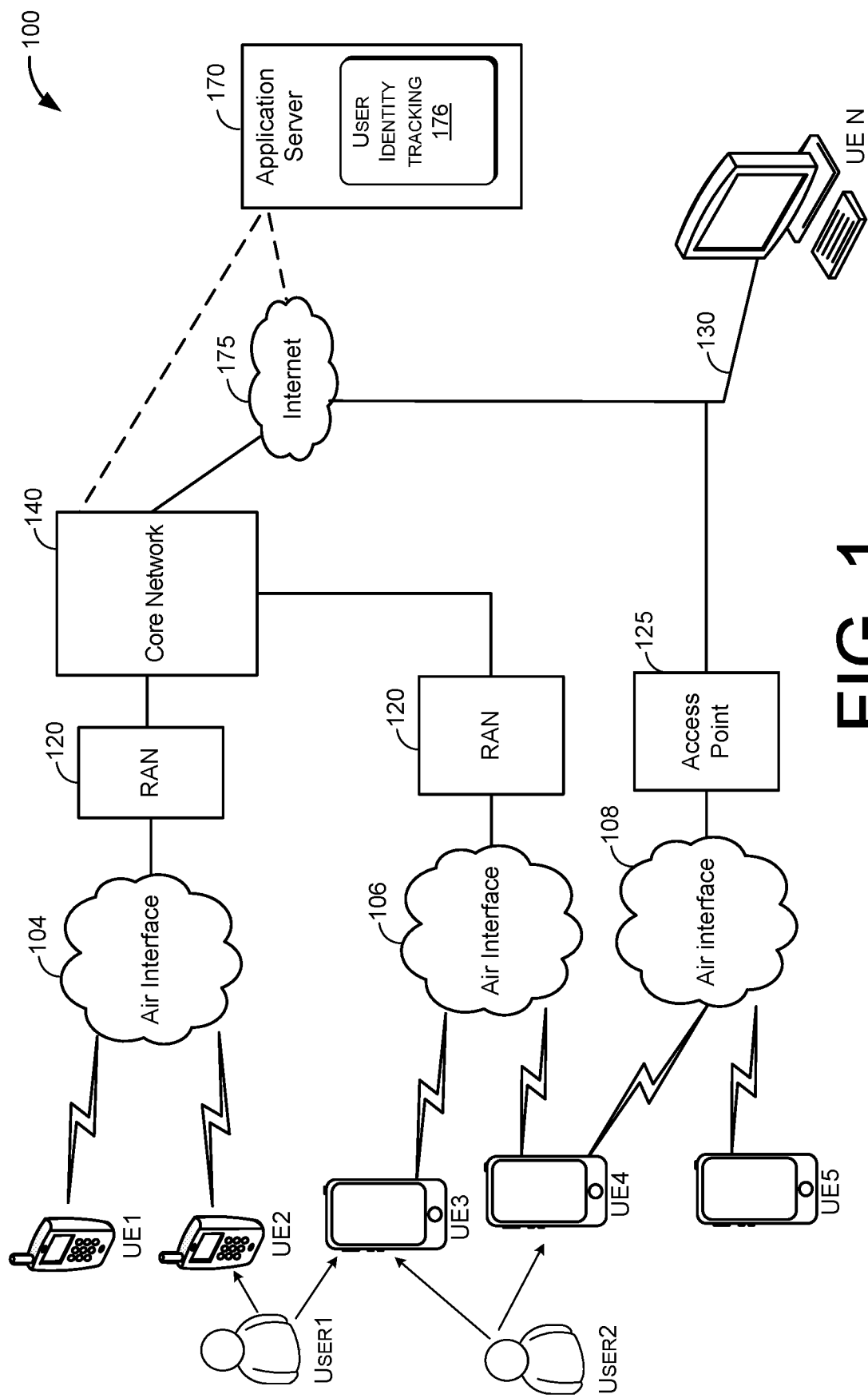
FIG. 1 illustrates an example architecture of a wireless communication network.

FIG. 1 illustrates a high-level system architecture of a wireless communication network 100 in accordance with various aspects. The wireless communication network 100 contains UEs 1 ... N. The UEs 1 ... N can include mobile phones, personal computers (e.g., a laptop computer, desktop computer, etc.), television receivers (e.g., a television, streaming device, digital video recorder, etc.), voice-activated virtual assistants (e.g., GOOGLE HOME, AMAZON ECHO, etc.), gaming consoles (e.g., MICROSOFT XBOX, SONY PLAYSTATION, NINTENDO SWITCH, 3DS, etc.), network devices (e.g., hub, switch, bridge, router, gateway, network interface card, wireless access point, modem, etc.) and so on. For example, in FIG. 1, UEs 1 ... 2 are illustrated as cellular mobile phones, UEs 3 . . . 5 are illustrated as cellular touchscreen mobile phones or smart phones, and UE N is illustrated as a desktop computer or laptop.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection 130. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network) via direct wired connection 130. The Internet 175 can thereby function to bridge packet-switched data communications between UE N and UEs 1 . . . 5 via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection 130 to the Internet 175, such as a direct connection to a modem or router, which can correspond to the access point 125 itself in an example (e.g., for a WiFi router with both wired and wireless connectivity).

The core network 140 is configured to support one or more communication services (e.g., Voice-over-Internet Protocol (VoIP) sessions, Push-to-Talk (PTT) sessions, group communication sessions, social networking services, etc.) for UEs that can connect to the core network 140 via the RANs 120 and/or via the Internet 175, and/or to provide content (e.g., web page downloads) to the UEs.

Referring to FIG. 1, a server 170 is shown as connected to the Internet 175, the core network 140, or both. The server 170 can be implemented as a plurality of structurally separate servers, or alternately may correspond to a single server.

As mentioned above, the wireless communication network 100 may provide for multi-user to multi-device capabilities. That is, the same user may utilize multiple different devices to access the wireless communication network 100 and multiple different users may utilize the same device to access the wireless communication network 100. For example, as shown in FIG. 1, User1 may utilize UE2 as well as UE3 to access wireless communication network 100. Similarly, User2 may utilize the same UE3 as well as a different UE (i.e., UE4) to access the wireless communication network 100. Accordingly, the server 170 includes a user identity tracking module 176 that is configured to enable the tracking of a specific user even when the user is associated with a group/family account that includes several users.

Figure 2:
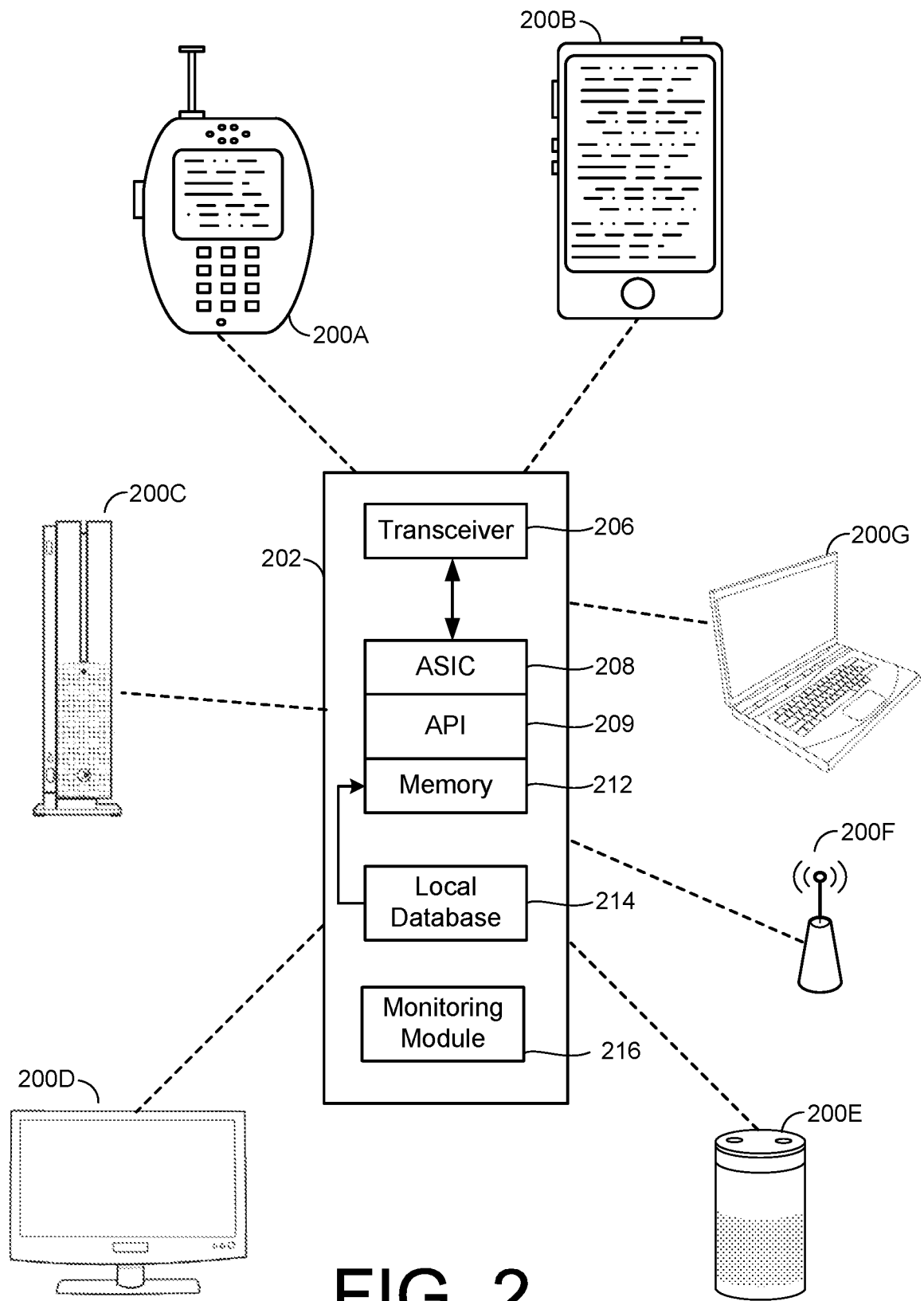
FIG. 2 illustrates examples of user equipments (UEs).

FIG. 2 illustrates examples of UEs (i.e., user devices) of various device types in accordance with embodiments of the invention. UEs 200A-G are possible implementations of any of the UEs 1-N of FIG. 1. The various device types illustrated in FIG. 2 include a mobile phone (e.g., UE 200A and UE 200B), a gaming console (e.g., UE 200C), a television receiver (e.g., UE 200D), a voice-activated virtual assistant device (e.g., UE 200E), a network device (e.g., UE 200F), and a personal computer (e.g., UE 200G).

A mobile phone device type, such as UEs 200A and 200B, may also be referred to as a cellular phone and includes portable telephones that can make and receive calls over a radio frequency link while the user is moving within a telephone service area.

A game console device type, such as UE 200C may include an electronic, digital, or computer device that outputs a video signal or visual images to display a video game that one or more users can play. In some aspects, a game console device type may use proprietary formats unlike other consumer electronics (e.g., music players, movie players, etc.) which utilize industry-wide standard formats.

A television receiver device type, such as UE 200D, may include a television set, a television tuner, smart tv, a digital video recorder, and/or a video streaming device. In some aspects, a television receiver device type may include a display as well as speakers for the purpose of viewing video content.

A voice-activated virtual assistant device type, such as UE 200E, may be configured to perform tasks or services for a user based on voice commands.

A network device type, such as UE 200F, may include networking hardware and/or software, which are configured to facilitate communication and interaction between devices on a computer network. Network device types may include gateways, routers, network bridges, modems, wireless access points, networking cables, line drivers, switches, hubs, and repeaters; and may also include hybrid network devices such as multilayer switches, protocol converters, bridge routers, proxy servers, firewalls, network address translators, multiplexers, network interface controllers, wireless network interface controllers, ISDN terminal adapters and other related hardware.

A personal computer (PC) device type, such as UE 200G, may include a multi-purpose computer whose size, capabilities, and price make it feasible for individual use. In some aspects, PCs are intended to be operated directly by an end user, rather than by a computer expert or technician.

While internal components of UEs such as the UEs 200A-G can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 209 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 200A-G, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, the platform 202 is illustrated as including a monitoring module 216. In one aspect, monitoring module 216 is a client-side application that interacts with an operating system of the platform 202 to intercept client-side application and device use. The device/application use may then be incorporated into telemetry data that is then provided to the server 170 for analysis. In some aspects, the telemetry data may include information regarding which applications are being used, a location of the UE (e.g., GPS location coordinates and/or WiFi location), the UE user-controlled configurations (e.g., screen brightness, Bluetooth enabled, sound volume, etc.), and so on.

Thus, in some aspects, the ASIC 208, memory 212, API 209, local database 214, and monitoring module 216 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the invention is not limited to the illustrated features or arrangement.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. Voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 3:
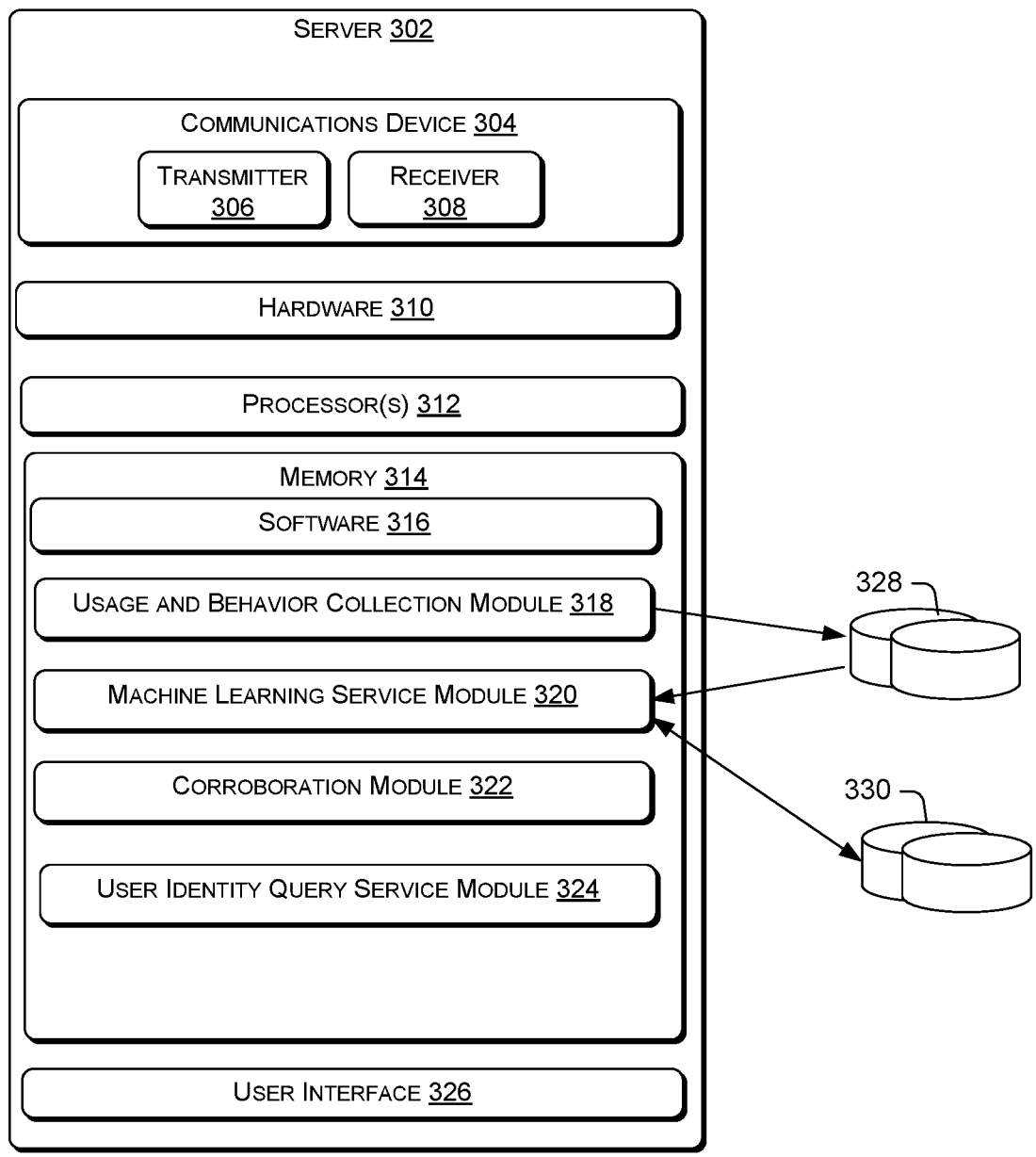
FIG. 3 illustrates an example server.

FIG. 3 illustrates an example server 302. Server 302 is one possible implementation of server 170 of FIG. 1. The components illustrated in FIG. 3 may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The server 302 may include at least one communication device (represented by the communication device 304) for communicating with other nodes. For example, the communication device 304 may comprise a network interface that is configured to communicate with one or more network entities via wire-based or wireless links. In some aspects, the communication device 304 may be implemented as a transceiver configured to support wire-based or wireless signal communication. This communication may involve, for example, sending and receiving: messages, parameters, or other types of information. Accordingly, in the example of FIG. 3, the communication device 304 is shown as comprising a transmitter 306 and a receiver 308.

The server 302 may also include other components that may be used in conjunction with the operations as taught herein. For example, the server 302 may include hardware 310, one or more processors 312, memory 314, and a user interface 326.

The hardware 310 may include additional hardware interfaces, data communications, and/or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

In addition, the server 302 may include a user interface 326 for providing indications (e.g., audible and/or visual indications) to a user and/or for receiving user input (e.g., upon user actuation of a sensing device such a keypad, a touch screen, a microphone, and so on).

The memory 314 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processor 312 of server 302 may execute instructions and perform tasks under the direction of software components that are stored in memory 314. For example, the memory 314 may store various software components that are executable or accessible by the one or more processors 312 of the server 302. The various components may include software 316, a usage and behavior collection module 318, a machine learning service module 320, a corroboration module 322, and a user identity query service module 324. The software 316, usage and behavior collection module 318, machine learning service module 320, corroboration module 322, and user identity query service module 324, collectively, may be one possible implementation of user identity tracking module 176 of FIG. 1.

The software 316, usage and behavior collection module 318, machine learning service module 320, corroboration module 322, and user identity query service module 324 may include routines, program instructions, objects, and/or data structures that perform particular tasks or implement particular abstract data types. For example, the usage and behavior collection module 318 may include one or more instructions, which when executed by the one or more processors 312 direct the server 302 to perform operations related to the collection of account and UE usage and behavior. That is, the usage and behavior collection module 318 may be configured to receive telemetry data from one or more UEs and store the telemetry data into one or more databases 328. In addition, the usage and behavior collection module 318 may be configured to receive (and store in one or more databases 328) telemetry data from one or more other servers included in core network 140 related to the usage of the wireless communication network 100 by a UE and/or by an account. In one example, the one or more databases 328 are included in memory 314 of server 302.

The machine learning service module 320 may include one or more instructions, which when executed by the one or more processors 312 direct the server 302 to perform operations related to the analysis of telemetry data stored in the one or more databases 328 to determine usage patterns. In one example, the determined usage patterns are clustered by identity and/or persona. For example, a cluster may be of "John Smith", or alternatively, "John Smith Personal," or "John Smith Work," etc. In some aspects, the usage patterns may identify a series of UE usages, service usages, settings, configurations, locations, etc., that correspond to a particular user.

The machine learning service module 320 may be configured to store the one or more determined usage patterns (clustered by identity) to a profile database 330.

In some examples, the machine learning service module 320 may implement a machine learning technique that is a supervised, unsupervised, or a reinforcement learning technique. Examples of supervised learning techniques include K-nearest neighbor (KNN), Naive Bayes, logistic regression, support vector machine (SVM), and others. Other supervised learning analysis techniques include linear or polynomial regression analysis, decision tress analysis, and random forests analysis. Examples of unsupervised learning analysis techniques include association analysis, clustering analysis, dimensionality reduction analysis, hidden Markov model analysis techniques, and others. Examples of clustering analysis techniques include K-means, principal component analysis (PCA), singular value decomposition (SVD), incremental clustering, and probability-based clustering techniques. The reinforcement learning technique may be, for example, a Q-learning analysis technique. The techniques described above are some examples of machine learning techniques that may be utilized by the machine learning service module 320 to generate clustered usage patterns. These are not intended to be limiting.

The machine learning service module 320 may also be configured to determine (e.g., calculate) a confidence level mapping the data stored in the one or more databases 328 to a specific user or persona.

Still referring to FIG. 3, the corroboration module 322 may include one or more instructions, which when executed by the one or more processors 312 direct the server 302 to perform operations related to corroborating the clustered usage patterns generated by the machine learning service module 320. For example, in one aspect, the corroboration module 322 may be configured to periodically send a notification to a UE to determine which user performed which task. In one example, the notification may be sent to the UE via a text message. Upon receiving a response to the notification, indicating which user performed which tasks, the corroboration module 322 may provide feedback to the machine learning service module 320. Thus, the corroboration module 322 may enable the machine learning service module 320 to correct false positives in the data.

The user identity query service module 324 may include one or more instructions, which when executed by the one or more processors 312 direct the server 302 to perform operations related to providing the MNO and/or third-parties with the ability to perform a query to determine what activity was done by a particular user. For example, the user identity query service module 324 may inform the surfacing of advertising and/or offers provided by a third-party. In one example, the query service provided by the user identity query service module 324 is only enabled once the confidence level mapping user activity to a specific user reaches a predetermined threshold.

Figure 4A:
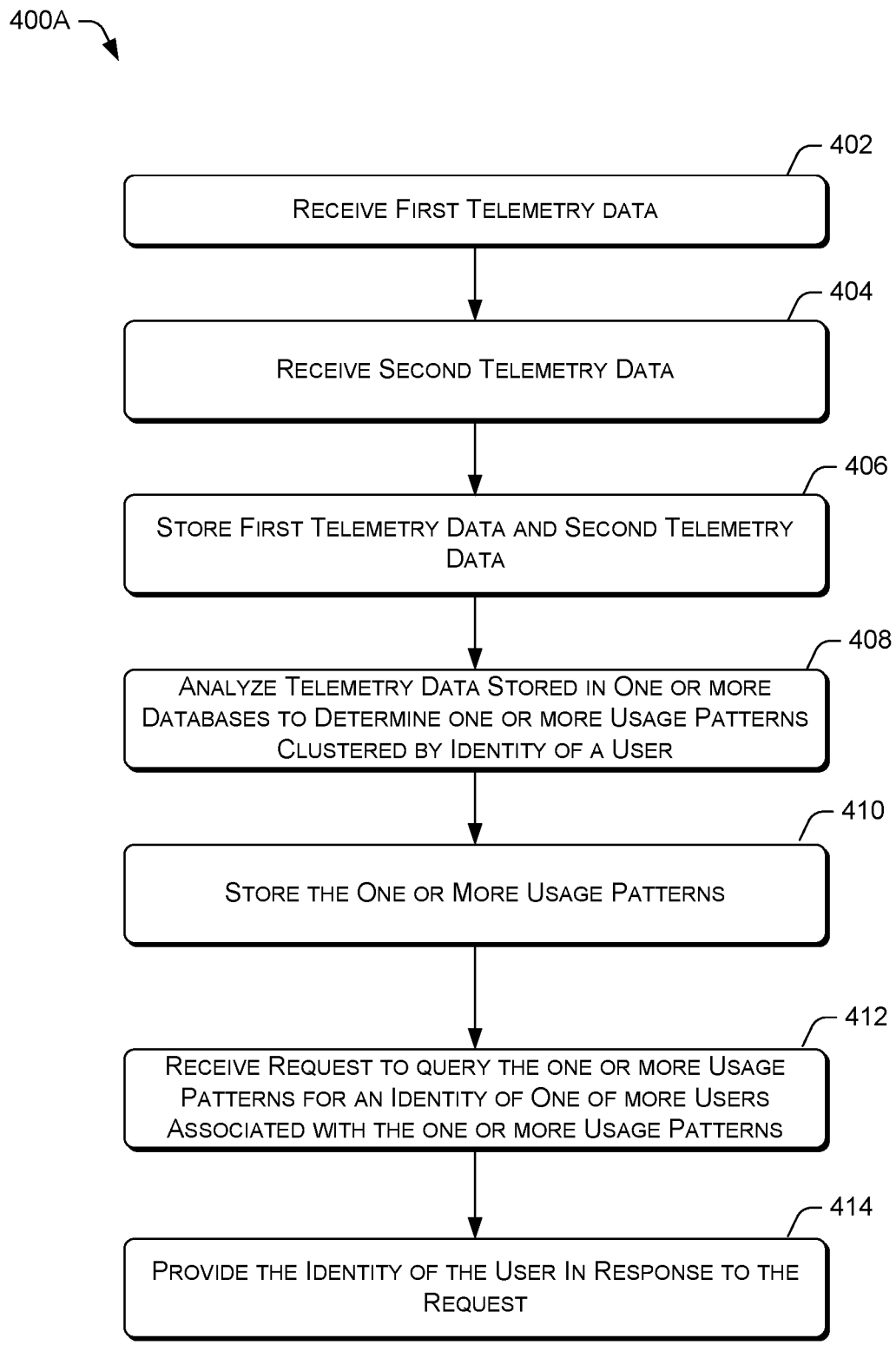
FIG. 4A is a flow diagram of an example process for user identity tracking.

FIG. 4A is a flow diagram of an example process 400A for user identification. Process 400A is one possible process performed by server 170 of FIG. 1 and/or server 302 of FIG. 3. Process 400A will be described with reference to FIGS. 2-4A.

In a process block 402, the usage and behavior collection module 318 collects (e.g., receives) first telemetry data. In one aspect, the first telemetry data is received from a first user device (i.e., a first UE) of a first device type (e.g., device type 200A-200G). The first telemetry data may include a time-ordered series of activities and/or services utilized by a user of the first user device.

Next, in a process block 404, the usage and behavior collection module 318 collects (e.g., receives) second telemetry data. In one aspect, the second telemetry data is received from a second user device (i.e., a second UE) of a second device type (e.g., device type 200A-200G). In some examples, the second device type is a different device type than the first device type (e.g., first device type may be a personal computer device type and the second device type may be a gaming console device type). The second telemetry data may also include a time-ordered series of activities and/or services utilized by a user of the second user device. The usage and behavior collection module 318 may then store the collected first and second telemetry data to the one or more databases 328 (e.g., process block 406).

In a process block 408, the machine learning service module 320 may then analyze the telemetry data stored in the one or more databases 328 to determine one or more usage patterns clustered by identity. In one aspect, clustering by identity means clustering data where the atomic units are persons, a non-person user (e.g. machine), or sets of users. An example of a set of users is a family account where multiple users are associated with a single account identifier. Furthermore, a set of users may be associated by another identifier even though there are multiple account identifiers, such as with a group identifier that groups a set of account identifiers, the account identifiers associated with a single use. A set of users may alternatively be associated with a set of device identifiers.

Where data is clustered by identity, the atomic units are measured for similarity to each other via a machine learning technique in machine learning service module 320. Where two atomic units, such as two accounts are similar, the machine learning service module 320 may infer that the data associated with the first account may be similar to the data associated with the second account to a measurable degree of confidence. By way of example, machine learning service module 320 may apply one or more machine learning techniques to the data stored in the databases 328 to associate one or more account or UE usages with a particular user. The one or more account usages may include an indication of services utilized by a particular account (e.g., text messaging, phone calling, etc.). The one or more UE usages may include, for example, which applications have been launched, as well as user-controlled UE settings, such as screen brightness, volume level, and the like. In addition, the one or more account or UE usages may include associated timing information, such as the duration of a usage (e.g., how long was the web browser open) and/or a respective time that the usage occurred (e.g., web browsing occurred immediately after text message was sent). In one example, the machine learning service module 320 may store the determined usage patterns as a plurality of clusters and an associated user identity of each to profile database 330 (e.g., process block 410).

Next, in a process block 412, the user identity query service module 324 may receive a request to query one or more usage patterns for an identity of one or more users associated with the one or more usage patterns. By way of example, the user identity query service module 324 may receive a request from the MNO (e.g., via core network 140 of FIG. 1) for the identity of a user who performs one or more UE and/or service usages (e.g., particular applications launched, particular UE settings, particular website visited, etc.). In another example, the received request may be received from a third party (e.g., advertiser) to query which user(s) are associated with a particular cluster.

In a process block 414, the user identity query service module 324 may query the one or more databases 328 and the profile database 330 to determine an identity of the corresponding user and then provide the identity to the requestor (e.g., MNO, advertiser, etc.).

Figure 4B:
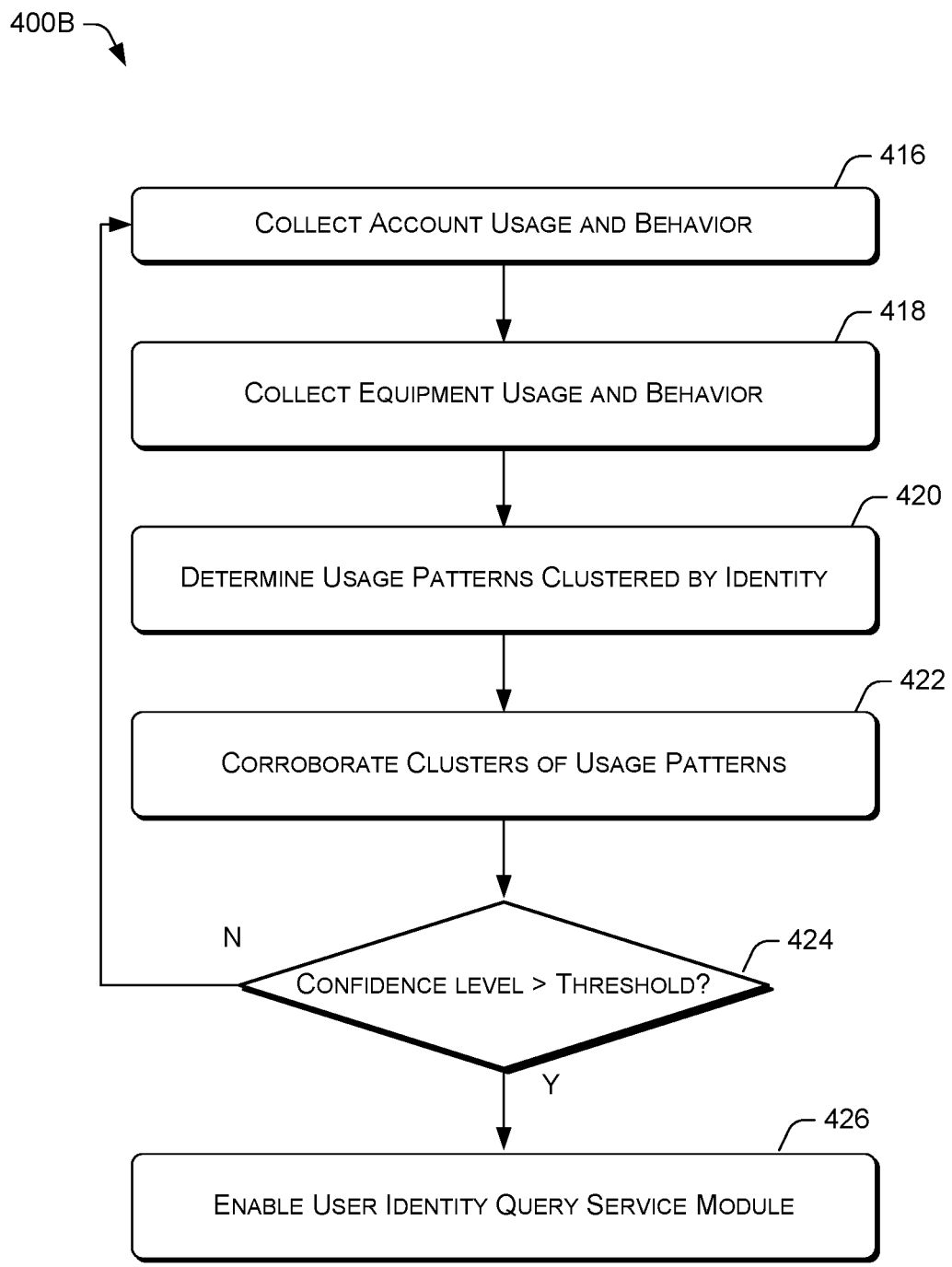
FIG. 4B is a flow diagram of another example process for user identity tracking.

FIG. 4B is a flow diagram of an example process 400B for user identification. Process 400B is one possible process performed by server 170 of FIG. 1 and/or server 302 of FIG. 3. Process 400B will be described with reference to FIGS. 2-4B.

In a process block 416, the usage and behavior collection module 318 collects (e.g., receives) account usage and behavior telemetry data. As mentioned above, the usage and behavior collection module 318 may receive the data from one or more other servers included in core network 140, where the data relates to activities and/or services utilized by account. The usage and behavior collection module 318 may then store the collected data to the one or more databases 328.

Next, in a process block 418, the usage and behavior collection module 318 collects (e.g., receives) equipment usage and behavior telemetry data. As mentioned above, the usage and behavior collection module 318 may receive the data from one or more UEs by way of the monitoring module 216 (e.g., see FIG. 2). In one example, the received data relates to activities and/or device usage data collected locally at the UE. In one aspect, the monitoring module 216 may periodically upload telemetry data to the server 302 according to a predetermined schedule. In another example, the server 302 may send a request to the monitoring module 216 for the latest telemetry data. The usage and behavior collection module 318 may then store the collected data to the one or more databases 328.

In a process block 420, the machine learning service module 320 may then determine usage patterns clustered by identity. In one aspect, clustering by identity means clustering data where the atomic units are persons, a non-person user (e.g. machine), or sets of users. An example of a set of users is a family account where multiple users are associated with a single account identifier. Furthermore, a set of users may be associated by another identifier even though there are multiple account identifiers, such as with a group identifier that groups a set of account identifiers, the account identifiers associated with a single user. A set of users may alternatively be associated with a set of device identifiers.

Where data is clustered by identity, the atomic units are measured for similarity to each other via a machine learning technique in machine learning service module 320. Where two atomic units, such as two accounts, are similar, the machine learning service module 320 may infer that the data associated with the first account may be similar to the data associated with the second account to a measurable degree of confidence. By way of example, machine learning service module 320 may apply one or more machine learning techniques to the data stored in the databases 328 to associate one or more account or UE usages with a particular user. The one or more account usages may include an indication of services utilized by a particular account (e.g., text messaging, phone calling, etc.). The one or more UE usages may include, for example, which applications have been launched, as well as user-controlled UE settings, such as screen brightness, volume level, and the like. In addition, the one or more account or UE usages may include associated timing information, such as the duration of a usage (e.g., how long was the web browser open) and/or a respective time that the usage occurred (e.g., web browsing occurred immediately after text message was sent). In one example, the machine learning service module 320 may maintain a plurality of clusters and an associated user identity of each.

Next, in a process block 422, the corroboration module 322 may corroborate one or more clusters of usage patterns (i.e., the clusters of usage patterns determined by the machine learning service module 320). As mentioned above, the corroboration module 322 may be configured to periodically send a notification to a UE to determine which user performed which task. In one example, the notification may be sent to the UE via a text message. Upon receiving a response to the notification, indicating which user performed which tasks, the corroboration module 322 may provide feedback to the machine learning service module 320. Thus, the corroboration module 322 may enable the machine learning service module 320 to correct false positives in the data. For example, the machine learning service module 320 may generate a cluster of usages and associate that cluster with a particular user based on the telemetry data stored in the one or more databases 328. Subsequently, upon receiving a response to the notification, the corroboration module 322 determines that the cluster of usages does not necessarily correspond to that particular user. Thus, the corroboration module 322 may inform the machine learning service module 320 that that cluster of usages is no longer valid, or at least needs reevaluation.

In some aspects, the corroboration module 322 may be configured to periodically perform the corroboration of one or more clusters. In another aspect, the corroboration module 322 may be configured to corroborate each new cluster in response to the machine learning service module 320 generating a new cluster.

As mentioned above, the machine learning service module 320 may also be configured to determine (e.g., calculate) a confidence level for mapping the data stored in the one or more databases 328 to a specific user or persona. Thus, each of the clusters maintained by the machine learning service module 320 may also include an associated confidence level. As the machine learning service module 320 analyzes further data stored in the databases, the machine learning service module 320 may update the confidence level associated with one or more previously identified clusters.

Thus, in process block 424, the server 302 (e.g., by way of processor 312) determines whether the confidence level associated with a cluster meets a predetermined threshold (e.g., confidence level is greater than a predetermined minimum). If not, the process returns back to process block 402 to continue collecting account usage and behavior data. However, if the server 302 does indeed determine that the confidence level meets the threshold, then the user identity query service module 322 enables the associated cluster to be queried (e.g., process block 426). In one example, enabling the associated cluster to be queried includes enabling the MNO of the wireless communication network 100 to query which user(s) are associated with a particular cluster. In another example, enabling the associated cluster to be queried includes enabling a third party (e.g., advertisers) to query which user(s) are associated with a particular cluster.

Figure 5:
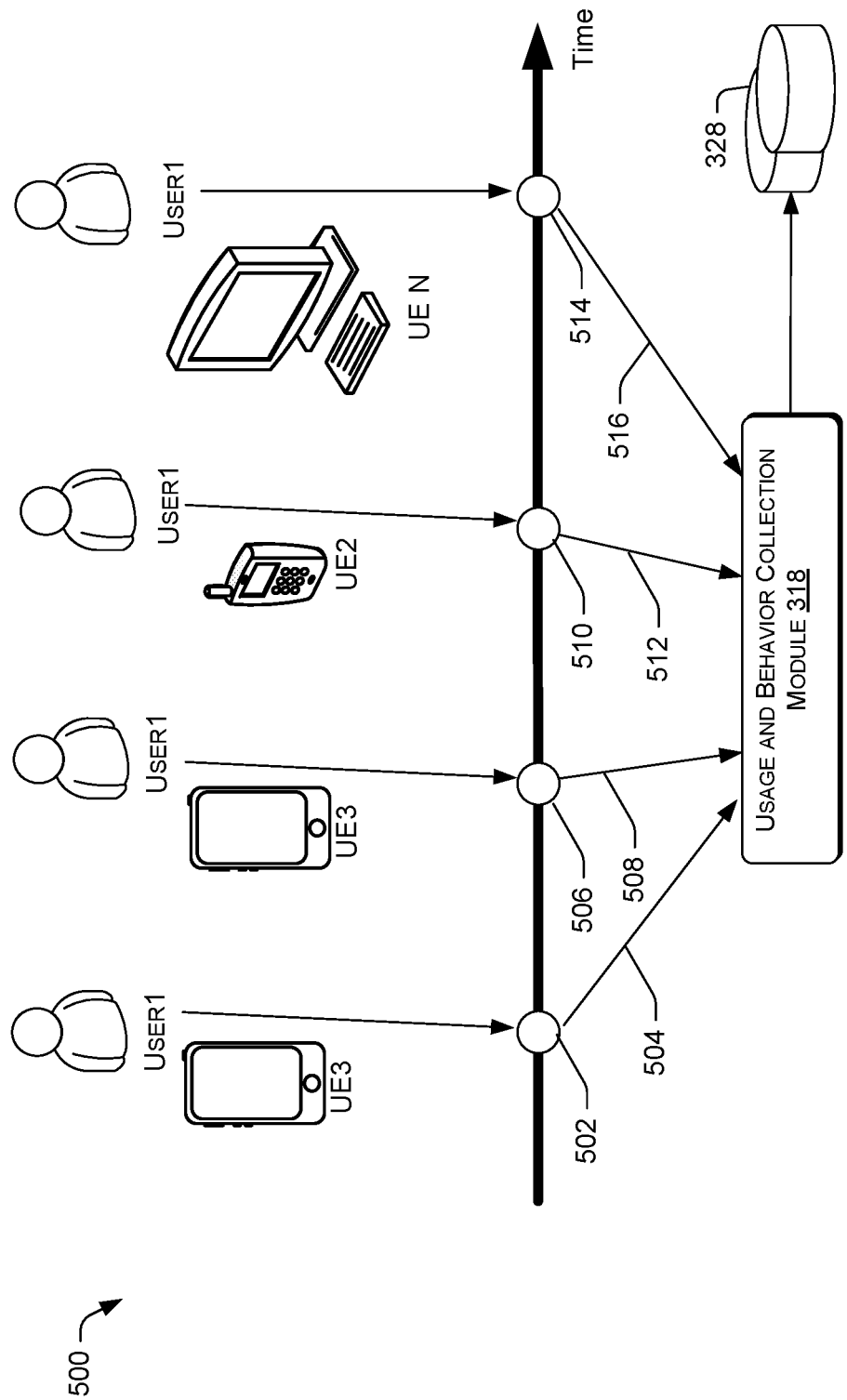
FIG. 5 is a diagram illustrating the collection of usage and behavior data.

FIG. 5 is a diagram illustrating the collection of equipment (i.e., UE) usage and behavior data. Specifically, it illustrates how a User1 progresses over time and develops a historical (time-ordered series) of equipment usage and behavior. In example, the illustrated usage events 502, 506, 510, and 514, collectively, represent a time-ordered series of events.

For example, User1 may interact with UE3 to generate a usage event 502. Usage event 502 could possibly be User1 using UE3 to access a web site at a particular URL. User1 may also make some purchases during the usage event 502. Data collected during usage event 502 and subsequent usage events may be sent from the monitoring module 216 to usage and behavior collection module 318 as telemetry data 504. The usage and behavior collection module 318 then stores records of usage event 502 to the one or more databases 328.

As User1 progresses over time, telemetry data (e.g., 508, 512, and 516) of subsequent usage events (e.g., 506, 510, and 514) are also collected by the usage and behavior collection module 318. For example, as shown via usage event 506, User1 may later interact with a different information system (e.g., different website) using the same UE3. For example, usage event 506 may be User1 using UE3 to update the user's social network records at another URL. The data collected during usage event 506 may then be stored as telemetry data 508.

Accordingly, the telemetry data collected with respect to a particular user need not be specific to a particular site or to a particular type of interaction. Any definable and observable user event whose parameters may be captured is a candidate to be stored as one or more telemetry data for a user.

Furthermore, telemetry data for a user need not be specific to a particular client device. As shown via usage event 510, which may be after a number of other usage events, User1 may use a different client device, here client UE2 to interact with an information system. Usage event 510 could potentially be User1 further updating the user's social network records, perhaps to upload a picture just taken with UE2. Again, usage and behavior collection module 318 may receive the telemetry data 512 and stores the telemetry data 512 to the one or more databases 328.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of user identity tracking performed by an application server, the method comprising:
 receiving, at the application server, first telemetry data, wherein the first telemetry data indicates at least a first usage of a first user device;
 receiving, at the application server, second telemetry data, wherein the second telemetry data indicates at least a second usage of a second user device;
 storing the first telemetry data and the second telemetry data to one or more databases;
 analyzing, at the application server, telemetry data, including the first telemetry data and the second telemetry data, stored in the one or more databases to determine one or more usage patterns clustered by an identity that corresponds to a set of multiple users;
 storing the one or more usage patterns;
 receiving, at the application server, a request to query the one or more usage patterns for any identity associated with the one or more usage patterns; and
 providing, by the application server, the identity that corresponds to the set of multiple users in response to the request.

2. The method of claim 1, wherein the first user device is of a first device type and the second user device is of a second device type.

3. The method of claim 2, wherein the first device type is a device type selected from a group consisting of a mobile phone, a personal computer, a television receiver, a voice-activated virtual assistant device, a gaming console, and a network device, and wherein the second device type is a different device type selected from the group.

4. The method of claim 1, further comprising:
 receiving, at the application server, third telemetry data, wherein the third telemetry data indicates one or more activities or services utilized by an account of a user included in the set of multiple users; and
 storing the third telemetry data to one or more databases, wherein analyzing the telemetry data includes analyzing the third telemetry data to determine the one or more usage patterns.

5. The method of claim 1, wherein analyzing the telemetry data comprises applying, by a machine learning service module of the application server, one or more machine learning techniques to the telemetry data stored in the one or more databases to associate a first usage and a second usage with the identity.

6. The method of claim 5, further comprising:
 corroborating, by the application server, that the identity corresponding to the set of multiple users is correctly associated with the one or more usage patterns; and
 providing feedback to the machine learning service module based on the corroborating.

7. The method of claim 6, wherein the corroborating comprises:
 sending a notification to a user device associated with a user, wherein the notification identifies at least one of the first usage or the second usage; and
 receiving a response to the notification, wherein the response indicates the identity that is associated with the at least one of the first usage or the second usage.

8. The method of claim 7, wherein sending the notification comprising sending a text message to the user device associated with the user.

9. The method of claim 1, further comprising:
determining a confidence level associated with the one or more usage patterns.

10. The method of claim 9, further comprising:
enabling the one or more usage patterns to be queried in response to determining that the confidence level exceeds a predetermined threshold;
granting the request to query the one or more usage patterns in response to the enabling of the one or more usage patterns; and
denying the request to query the one or more usage patterns in response to the querying of the one or more usage patterns being disabled.

11. The method of claim 1, wherein at least one of the first telemetry data or the second telemetry data comprises a time-ordered series of device usages.

12. An application server, comprising:
at least one processor; and
at least one memory coupled to the at least one processor, the at least one memory having instructions stored therein, which when executed by the at least one processor, direct the application server to:
receive first telemetry data, wherein the first telemetry data indicates at least a first usage of a first user device of a first device type;
receive, at the application server, second telemetry data, wherein the second telemetry data indicates at least a second usage of a second user device of a second device type;
store the first telemetry data and the second telemetry data to one or more databases;
analyze telemetry data, including the first telemetry data and the second telemetry data, stored in the one or more databases to determine one or more usage patterns clustered by an identity of a user;
store the one or more usage patterns;
determine a confidence level associated with the one or more usage patterns;
enable the one or more usage patterns to be queried in response to determining that the confidence level exceeds a predetermined threshold;
receive a request to query the one or more usage patterns for any identity associated with the one or more usage patterns, wherein the request is received in response to the one or more usage patterns being enabled for querying; and
provide the identity of the user in response to the request.

13. The application server of claim 12, wherein the first device type is a device type selected from a group consisting of a mobile phone, a personal computer, a television receiver, a voice-activated virtual assistant device, a gaming console, and a network device, and wherein the second device type is a different device type selected from the group.

14. The application server of claim 12, wherein the instructions to direct the application server to receive the first telemetry data comprises instructions to communicate with a monitoring module of the first user device, wherein the monitoring module of the first user device is configured to intercept client-side application or device use and to incorporate the application or device use into the first telemetry data.

15. The application server of claim 12, wherein the instructions further direct the application server to:

receive third telemetry data, wherein the third telemetry data indicates one or more activities or services utilized by an account of the user; and
store the third telemetry data to one or more databases, wherein the instructions to analyze the telemetry data includes instructions to analyze the third telemetry data to determine the one or more usage patterns.

16. The application server of claim 12, wherein the instructions to analyze the telemetry data comprises instruction to apply, by a machine learning service module of the application server, one or more machine learning techniques to the telemetry data stored in the one or more databases to associate the first and second usages with the identity.

17. The application server of claim 16, wherein the instructions further direct the application server to:
corroborate that the identity corresponding to the set of multiple users is correctly associated with the one or more usage patterns; and
provide feedback to the machine learning service module based on the corroborating.

18. One or more non-transitory computer-readable media storing computer-executable instructions, which when executed by at least one processor of an application server, direct the application server to:
receive first telemetry data, wherein the first telemetry data indicates at least a first usage of a first user device of a first device type;
receive, at the application server, second telemetry data, wherein the second telemetry data indicates at least a second usage of a second user device of a second device type;
store the first telemetry data and the second telemetry data to one or more databases;
analyze telemetry data, including the first telemetry data and the second telemetry data, stored in the one or more databases to determine one or more usage patterns clustered by an identity of a user, wherein the instructions to analyze the telemetry data comprises instruction to apply, by a machine learning service module of the application server, one or more machine learning techniques to the telemetry data stored in the one or more databases to associate the first usage and the second usage with the identity;
store the one or more usage patterns;
corroborate that the identity of the user is correctly associated with the one or more usage patterns by requesting one or more responses from at least one of the first user device or the second user device as to which user performed which task included in the one or more usage patterns;
provide feedback to the machine learning service module based on the corroborating;
receive a request to query the one or more usage patterns for any identity associated with the one or more usage patterns; and
provide the identity that corresponds to the set of multiple users in response to the request.

19. The one or more non-transitory computer-readable media of claim 18, wherein the first device type is a device type selected from a group consisting of a mobile phone, a personal computer, a television receiver, a voice-activated virtual assistant device, a gaming console, and a network device, and wherein the second device type is a different device type selected from the group.

20. The one or more non-transitory computer-readable media of claim 18, wherein the instructions further direct the application server to:

receive third telemetry data, wherein the third telemetry data indicates one or more activities or services utilized by an account of the user; and store the third telemetry data to one or more databases, wherein the instructions to analyze the telemetry data includes instructions to analyze the third telemetry data to determine the one or more usage patterns.

\* \* \* \* \*